Figure 1:
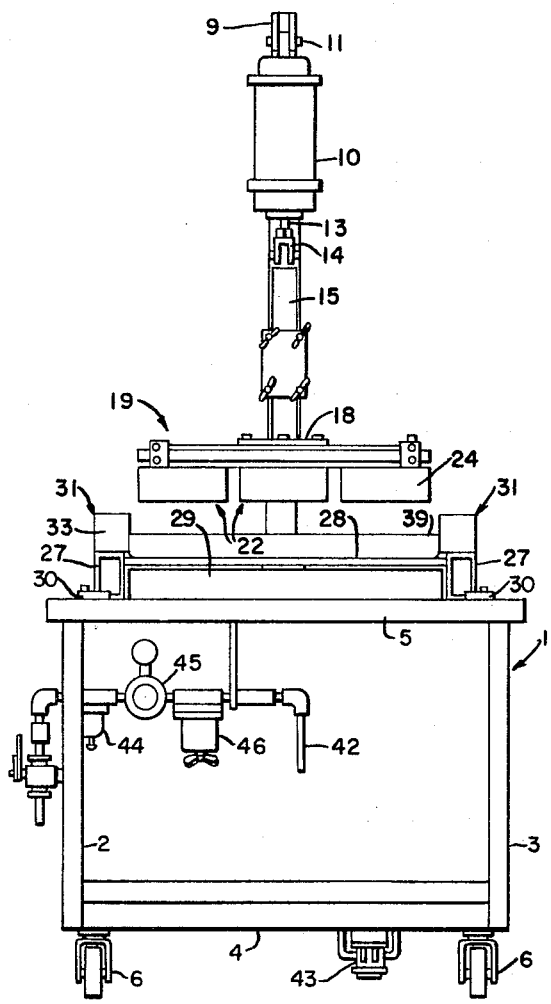

Oct. 25, 1966  J. E. TURNER  3,280,681
DOUGH CUTTING MACHINES
Filed July 13, 1965  3 Sheets-Sheet 1

INVENTOR
Joe E. Turner

BY *Arnold & Roylance*
ATTORNEYS

INVENTOR
Joe E. Turner

BY Arnold & Roylance
ATTORNEYS

Oct. 25, 1966   J. E. TURNER   3,280,681
DOUGH CUTTING MACHINES

Filed July 13, 1965   3 Sheets-Sheet 3

INVENTOR
Joe E. Turner
BY Arnold and Roylance
ATTORNEYS

United States Patent Office 3,280,681
Patented Oct. 25, 1966

3,280,681
DOUGH CUTTING MACHINES
Joe E. Turner, San Antonio, Tex., assignor to Mrs. Bohnet's Bakery, Inc., San Antonio, Tex., a corporation of Texas
Filed July 13, 1965, Ser. No. 471,685
6 Claims. (Cl. 83—169)

This invention relates to dough cutting apparatus and, more particularly, to improved apparatus for cutting one or more dough pieces into a plurality of segments.

The baking industry has recently introduced a type of bread now commonly known as "pull-apart hot bread." As supplied to the retailer, this product is in the form of a packaged loaf piece of dough which has been first divided into segments, usually somewhat thicker than the usual bread slice, and then partially baked. After the retail purchase, the consumer bakes the loaf and the bread is then served hot, the segments simply being pulled from the hot loaf so that the problems of slicing the bread while it is hot are avoided. Pull-apart hot bread is described, for example, in Bakers Weekly, April 5, 1965, vol. 206, No. 1, pages 14–19. The advent of this bakery product has created a need for an apparatus which would allow the baker to cut the dough pieces into segments more effectively and at less expense than has been possible heretofore.

Though various dough cutting or scoring machines have been proposed in the prior art, no such apparatus has proved fully satisfactory for use in producing pull-apart hot bread. A number of the prior-art devices which theoretically might serve this purpose have proved too expensive, both as to initial cost and as to the cost of operation and maintenance. Others are incapable of achieving the necessary high rate of operation. Still others are incapable of providing the clean deep cuts necessary to properly divide pull-apart loaf pieces.

It is accordingly a general object of this invention to devise an improved dough cutting apparatus which, overcoming the aforementioned deficiencies, is economically and operationally suitable for use by bakers in the production of pull-apart hot bread.

Another object is to provide such an apparatus which is simpler and less costly, yet capable of simultaneously cutting a number of dough pieces into segments while the dough pieces are disposed in the pans in which they are to be partially baked.

A further object is to provide a dough cutting apparatus employing a plurality of cutting elements and including improved and particularly effective means for applying an oil or like material to the cutting elements in a manner which assures that the dough will not stick to the cutting elements.

Yet another object is to devise an apparatus of the type described which is simply and easily operated, requiring that the operator only insert the dough pans, actuate a simple control device, such as a foot pedal, to accomplish cutting of the dough, remove the dough pans, and then again operate the same control device to accomplish oiling of the cutting elements.

Figure 2:
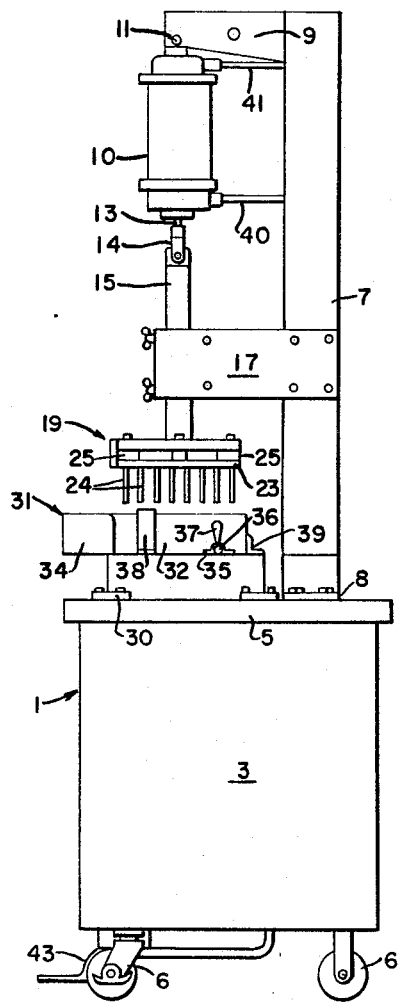
Figure 3:
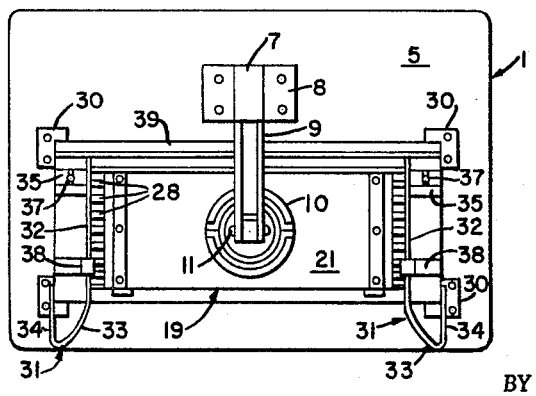
Figure 5:
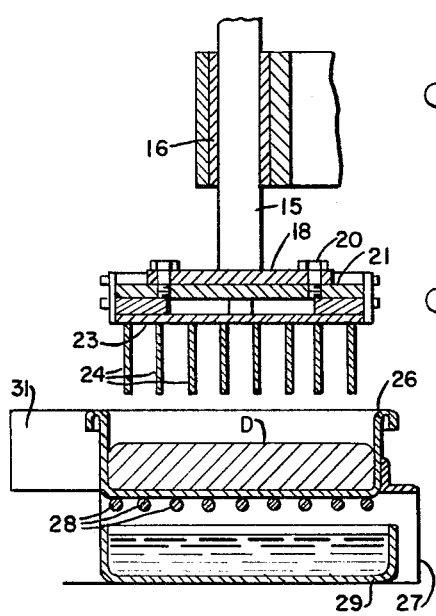
Figure 6:
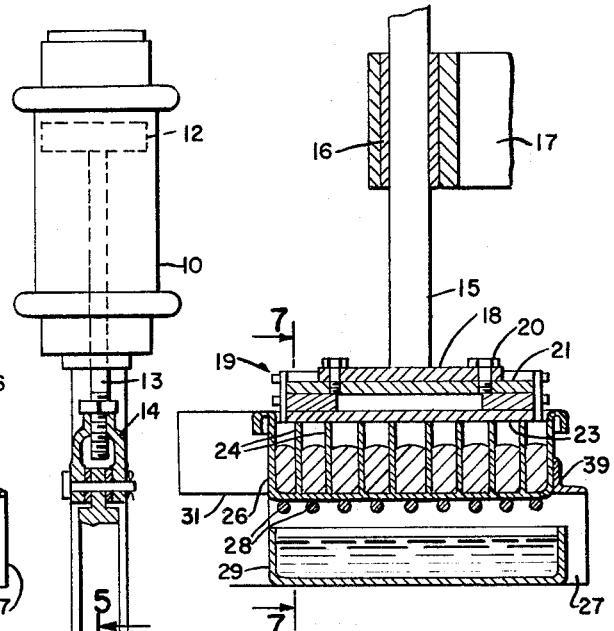
Figure 4:
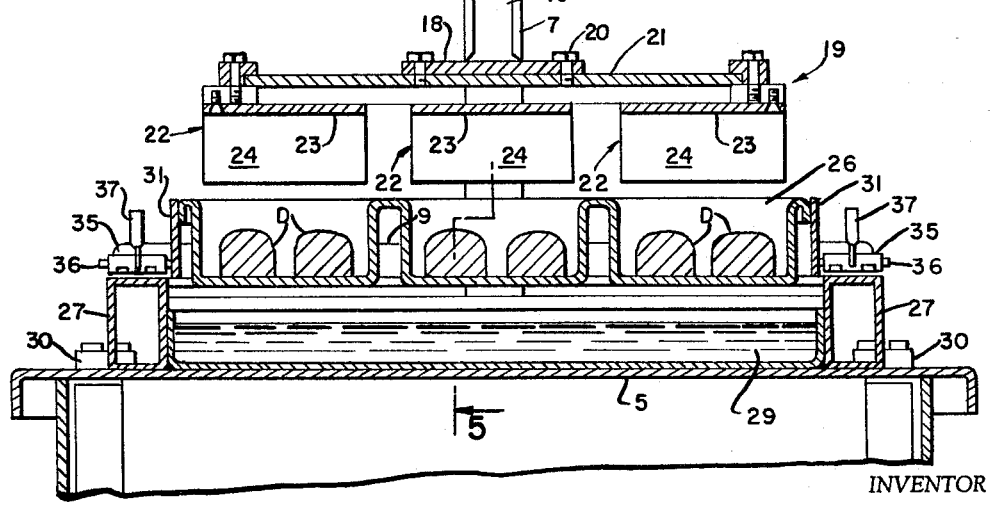
Figure 7:
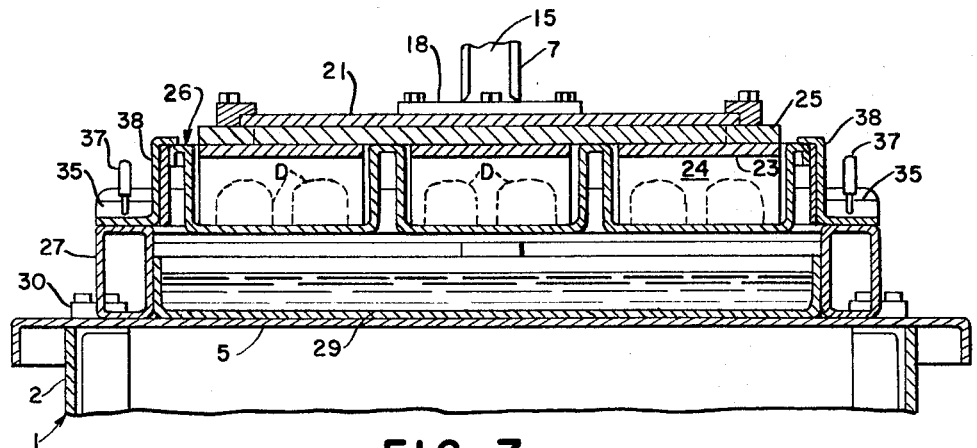
Figure 8:
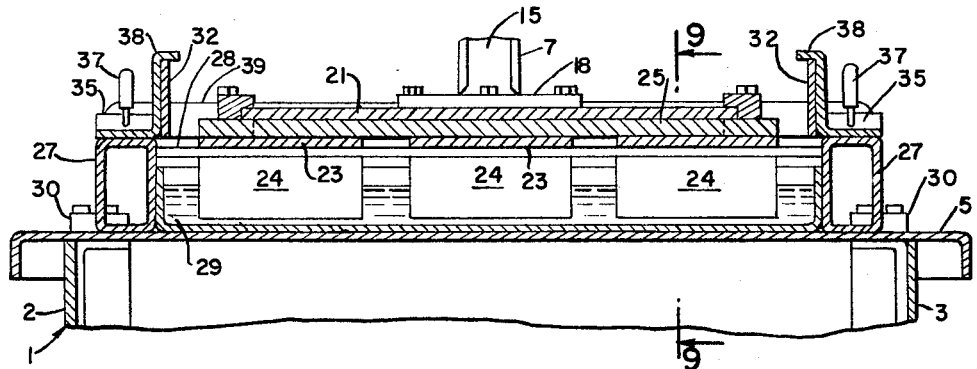
Figure 9:
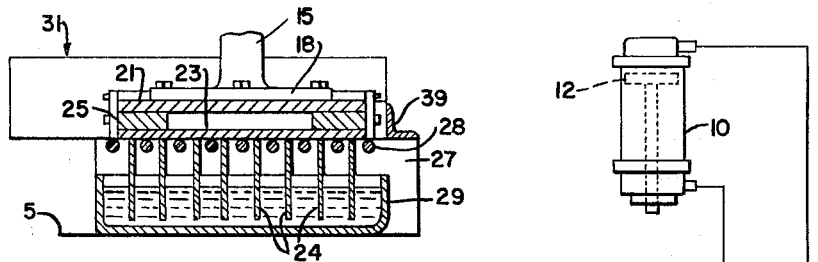
Figure 10:
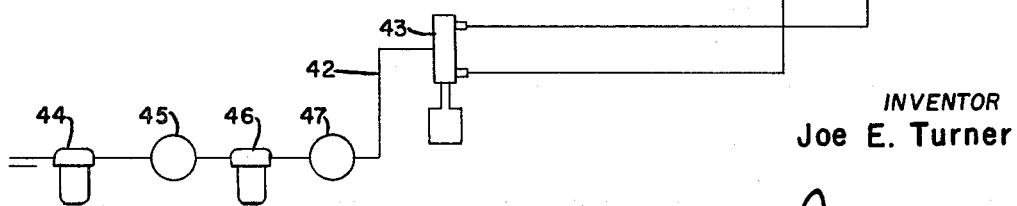

In order that the manner in which these and other objects are attained in accordance with the invention can be understood in detail, one particularly advantageous embodiment of the invention will be described with reference to the accompanying drawings, which form a part of this specification, and wherein:

FIG. 1 is a front elevational view of the apparatus;
FIG. 2 is a side elevational view thereof;
FIG. 3 is a top plan view thereof;
FIG. 4 is a transverse sectional view of a portion of the apparatus of FIG. 1, showing a plurality of dough-filled baking pans and a lubricant container in place thereon preparatory to operation of the apparatus to divide the dough pieces into segments;
FIG. 5 is a sectional view taken on line 5—5, FIG. 4;
FIG. 6 is a view similar to FIG. 5 but showing the cutter assembly at the end of the dough dividing stroke;
FIG. 7 is a transverse sectional view taken on line 7—7, FIG. 6;
FIG. 8 is a view similar to FIG. 4 but showing the apparatus with the baking pans removed and the cutter assembly at the end of the lubricating stroke;
FIG. 9 is a sectional view taken on line 9—9, FIG. 8; and
FIG. 10 is a schematic diagram of the pneumatic power system employed in the apparatus of FIG. 1.

Stated broadly, the apparatus provided by the invention comprises a frame, a generally horizontal support carried by the frame and onto which a baking pan or, preferably, an assembly of several baking pans can be placed manually, a cutting element assembly mounted on the frame and above the support for movement through a cutting stroke commencing at an inactive position and terminating at a position in which the cutting elements are adjacent the bottom of the baking pan, power means for driving the cutting element assembly, and a manual control for operating the power means. Advantageously, a pneumatic piston and cylinder is employed as the power means and the cutting stroke is terminated simply by employing air pressures and a motor design such that the stroke is stalled by the resistance offered by the bottom of the baking pan. A second support is carried by the frame below the baking pan support and is so arranged as to accommodate an oil pan. The baking pan support is provided with openings so positioned that the cutting elements can project downwardly through the baking pan support into the oil contained by the oil pan. Accordingly, the power means can be operated to move the cutting element assembly through an oiling stroke when no baking pans are present. In this connection, the operating characteristics of the pneumatic power device and its location on the frame relative to the baking pan and oil pan supports are such that, when no baking pan is present, the full stroke of the power device is adequate to move the cutting element assembly into proper position for oiling of the cutting elements.

Turning now to the drawings in detail, the illustrated embodiment of the invention comprises a rigid base frame indicated generally at 1 and comprising spaced, parallel side walls 2 and 3, a horizontal bottom wall 4 and a horizontal top 5. The structure is made mobile, and spaced above the floor or other support, by conventional casters 6.

Top 5 supports a rigid upright frame member 7 which extends vertically from a point which is spaced midway between side walls 2, 3 and disposed adjacent the back of the base frame structure. Frame member 7 is rigidly secured to top 5, as by bolted angle brackets 8. At is top, member 7 rigidly carries a forwardly projecting horizontal support 9 formed of two spaced parallel arms. The upper end of a conventional pneumatic cylinder 10 is secured to support 9, as by a mounting bolt 11, so that the cylinder 10 depends vertically toward top 5. Cylinder 10 is equipped with a piston 12, FIGS. 1 and 2, secured to a shaft 13, the shaft being connected by clevis 14 to a drive shaft 15 of square tranverse cross section. The drive shaft 15 is slidably accommodated by a vertical bearing 16, FIG. 4, supported by horizontal arms 17 secured to upright member 7.

At its lower end, shaft 15 rigidly carries a mounting plate 18 to which the cutter assembly, indicated generally at 19, is removably secured, as by bolts 20. Cutter assembly 19 comprises a rigid main horizontal plate 21 and three cutter blade units 22, each cutter blade unit including a flat support 23 from which a plurality of cutter blades 24 project in spaced parallel relation. The units 22 are held in a unitary assembly by two spaced parallel bars 25, to which the supports 23 are rigidly secured, and the assembly is detachably secured to plate 21 in any suitable fashion. The three cutter blade units 22 are spaced apart along a line extending at right angles to side walls 2, 3 of the base frame, and the blades 24 are spaced apart in a direction from front to rear of the apparatus. The dimensions of the cutter blade units, and their spacing from each other, are such that the three cutter blade units can be aligned simultaneously each above a different pan of a standard assembly or "strap" of three baking pans, such an assembly of pans being indicated at 26 in FIG. 4.

Top 5 of the base frame structure 1 supports two spaced parallel members 27 in the nature of straight bars which extend from front to the rear of the machine and are of rectangular transverse cross-section, being of tubular construction in this embodiment. The members 27 are rigidly interconnected by a plurality of horizontally spaced parallel rods 28, the rods 28 being joined at their ends to the respective members 27 at a distance above top 5 such that an upwardly opening pan 29, FIGS. 4–6, can be supported on top 5 in a position between members 27 and below rods 28. The pans 29 contains oil or other suitable conventional lubricant for the cutter blades 24 and simply rests on top 5, being laterally confined only by sliding engagement with the members 27, as seen in FIG. 4.

Members 27 are secured on top 5 in a predetermined fixed position relative to upright 7, and thus to drive shaft 15 and cutter assembly 19, by four corner brackets 30. This position is so selected that, being guided by the sliding engagement between shaft 15 and bearing 16, the cutter assembly 19 will follow a path of vertical travel such that the cutter blades 24 can pass freely between the rods 28.

In order to properly position the baking pan assembly 26 relative to cutter assembly 19, two guide rails 31 are each adjustably secured to a different one of members 27. Each guide rail 31 is formed from a stiff but resilient strip of metal including a straight main portion 32, which extends throughout the full length of the corresponding member 27, a curved nose portion 33, and a straight return portion 34, as best seen in FIG. 3. Near the rear end of each member 27, there is provided an eccentric slide bearing 35, and a shaft 36, accommodated by the bearing, is affixed to the corresponding guide rail 31, the arrangement being such that, when operating handle 37 is pivoted to one position, shaft 36 is free to slide in bearing 35 to allow adjustment of the guide rail and, when handle 37 is pivoted to a second position, the shaft 36 is locked against movement relative to the bearing and the guide rails is therefore fixed in its adjusted position. Near the front of the apparatus, each member 27 rigidly carries a bracket 38 which engages the outer face and the top edge of the corresponding guide rail 31, as will be clear from a comparison of FIGS. 2, 3 and 7. Considering FIGS. 3 and 4, it will be apparent that the positions of guide rails 31 can be so adjusted that the space between portions 32 will snugly accommodate the baking pan assembly 26. Accordingly, standing in front of the apparatus, the operator can easily slide the baking pan assembly into position on rods 28 and between guide rails 31, the guide rails slidably engaging the baking pan assembly and assuring that the individual pans thereof will each be positoned beneath a different one of the cutter blade units 22 in the manner seen in FIG. 4. To limit rearward movement of the baking pan assembly, and thus complete the positioning of the baking pans under the cutter blade units, a stop bar 39, FIG. 5, extends between members 27 and has its ends each rigidly attached to a different one of those members.

Accordingly once the operator has properly positioned the baking pan assembly 26 on rods 28 with the aid of guide rails 31 and stop bar 39, the cutter assembly can be moved from its raised inactive position, FIGS. 4 and 5, to a lowered position, FIG. 6, with all of the blades 24 of each unit 22 properly entering the corresponding one of the baking pans to divide the dough pieces D therein.

Referring now to FIG. 10, the cylinder 10 is equipped with an "up stroke" line 40 and a "down stroke" line 41, these lines being selectively connectable to a pressure fluid supply line 42 by action of a foot pedal operated valve 43. The supply line is provided with the usual water trap 44, pressure regular 45, oiler 46 and metering valve 47. Standing in front of the machine, the operator can easily manipulate valve 43 to supply pressure fluid to the cylinder via line 40, so that the piston 12 is forced upwardly to drive the cutter assembly 19 to the raised, inactive position shown in FIGS. 4 and 5. Having properly placed the baking pans on rods 28, the operator then manipulates valve 43 to supply pressure fluid to cylinder 10 via line 41, so that the piston 12 is forced downwardly until cutter blades 24, having fully entered the baking pans and divided the dough pieces D, are prevented from descending further. The design parameters of the cylinder 10, and the operating pressure of the power fluid, are so chosen that the downward stroke is stalled when the cutter blades 24, having divided the dough pieces, reach the positions seen in FIG. 6. The operator then again manipulates the pedal operated valve 43 to supply pressure fluid to cylinder 10 via line 40, so that the cutter assembly 19 is returned to its raised position, FIG. 4. The operator then removes the baking pan assembly 26 and, before inserting a fresh set of pans, operates valve 43 to again supply pressure fluid to cylinder 10 via line 41. As a result, the cutter assembly is driven downwardly and, there now being no baking pans present, is free to continue for a full downward stroke, so that the blades 24 pass between rods 28 and enter the oil or other lubricant contained in pan 29. With a fresh set of baking pans in readiness, the operator now again manipulates valve 43 to supply pressure fluid to cylinder 10 via line 40, so that the cutter assembly 19 is returned to its raised position, as in FIG. 4. The fresh set of baking pans is then placed on rods 28 and the sequence of operation is repeated.

Entrance of cutter blades 24 between rods 28 and into the body of lubricant contained in pan 29 assures a full and adequate coating of lubricant on each cutter blade, yet requires neither attention by the operator (other than manipulation of valve 43) nor complicated oiling or lubricating applicators of the type heretofore proposed. Further, the apparatus provides the operator with a choice as to whether the lubricant is applied to the cutter blades between each successive pair of dough cutting operations, or less frequently. Finally, using an oil pan 29 which extends for the full space between members 27, full lubrication of all cutters is assured, without adjustment, regardless of the particular cutter assembly 19 being employed.

What is claimed is:
1. In a dough cutting machine of the type described the combination of
    frame means;
    a first at least generally horizontal support carried by said frame means and upon which a baking pan containing a dough piece can be placed preparatory to cutting of the dough piece;
    a second at least generally horizontal support carried by said frame means and upon which a container of oil can be placed,
        said second support being disposed beneath said first support;
    a cutting element assembly comprising a plurality of spaced cutting elements;

means mounting said cutting element assembly for movement between an inactive initial position and a position adjacent said second support, said first support having openings positioned to allow said cutting elements to pass downwardly through said first support when no baking pan is present on said first support;

power means mounted on said frame means and operatively connected to said cutting element assembly for moving the same from said inactive position toward said supports through a dough cutting stroke, when a baking pan is present on said first support, and through an oiling stroke, when no baking pan is present on said first support, said power means being operative to return said assembly to its inactive position after each cutting stroke and after each oiling stroke; and manual control means operatively connected to said power means to operate the same for sequentially moving said cutting element through cutting and oiling strokes.

2. A dough cutting machine according to claim 1 and further comprising two horizontally spaced guide members operatively disposed on said first support for guiding an assembly of baking pans into a predetermined position on said first support, said cutting element assembly comprising a plurality of groups of said cutting elements with each of said groups disposed to register within a different one of the baking pans of such assembly of baking pans when the assembly of baking pans is in said pre-determined position, the cutting elements of each of said groups being parallel and extending in directions at least generally transverse to said guide members, said first support comprising a plurality of spaced horizontal members extending parallel to said cutting elements and so located that, during each oiling stroke of said cutting element assembly, said cutting elements project between said spaced horizontal members.

3. A dough cutting machine according to claim 1, wherein said power means comprises an expansible chamber rectilinear motor having a vertically extending power shaft, and conduit means connected to said motor to selectively supply pressure fluid thereto for driving said power shaft upwardly and downwardly, the location of said power means relative to said supports, the maximum stroke of said motor and the length of said power shaft being such that, through operation of said motor is effectively stalled at the end of each cutting stroke by the resistance offered by the baking pan and the dough therein, said motor is effective to move said cutting element assembly to such an extent, when no baking pan is present on said first support, that said cutting elements project downwardly through said first support.

4. A dough cutting machine according to claim 1, and further comprising an oil container removably supported by said second support and having an open top to allow entry of said cutting elements into said oil container.

5. In a dough cutting machine of the type described, the combination of base frame means having a horizontal top;

two elongated members secured to said top and extending in a direction from the front to the back of said base frame means, said elongated members being parallel and spaced apart to define an area of said top upon which an oil container can be placed;

a plurality of baking pan supporting rods extending between said elongated members, said supporting rods being parallel and having their end portions secured to the respective ones of said elongated members, said supporting rods lying in a common plane and being spaced apart in a direction from the front to the back of said base frame means;

two guide members each secured to a different one of said elongated members, said guide members being spaced apart and arranged to guide a baking pan assembly into a predetermined position on said supporting rods;

an upright support mounted on said base frame means and projecting upwardly from said top at a point rearwardly of said pre-determined position;

rectilinearly acting, fluid pressure operated power means mounted on said upright support and aligned above said predetermined position, said power means having a vertical output shaft and being operative selectively to drive said shaft downwardly and upwardly; and a cutting element assembly secured to said shaft and comprising a plurality of cutter units each including a plurality of downwardly directed cutting elements, said cutter units being spaced apart in the direction of the length of said supporting rods, said cutting elements of each of said units being parallel and spaced apart in a direction from the front to the back of said base frame means, the positions of said output shaft and said cutting elements being such that, when said power means is actuated to drive said cutting elements downwardly when a baking pan assembly is in said predetermined position on said supporting rods, said cutting elements of each of said cutter units will properly enter a different pan of the baking pan assembly and, when said power means is actuated to drive said cutting element assembly downwardly when no baking pan assembly is present, said cutting elements will pass between said supporting rods and can enter an oil container supported on said area of said top.

6. A dough cutting machine according to claim 5, wherein said shaft includes a portion of rectangular transverse cross section, and the machine further comprises a bearing of rectangular transverse cross section mounted on said upright support and slidably engaging said shaft to align the same in a predetermined position above said top.

References Cited by the Examiner

UNITED STATES PATENTS 612,001 4/1898 Jenkins _____ 83—169
1,309,419 7/1919 Rafert _____ 83—169 X

FOREIGN PATENTS 1,255,653 1/1961 France.

WILLIAM W. DYER, Jr., *Primary Examiner.*

J. M. MEISTER, *Assistant Examiner.*